United States Patent [19]
Ostrozynski et al.

[11] Patent Number: 4,640,962
[45] Date of Patent: Feb. 3, 1987

[54] SILICONE-MODIFIED POLYESTER RESIN AND SILICONE-SHEATHED POLYESTER FIBERS MADE THEREFROM

[75] Inventors: Robert L. Ostrozynski, Williamsville; George H. Greene, Croton-on-Hudson; James H. Merrifield, Mt. Kisco, all of N.Y.

[73] Assignee: Union Carbide Corporation, Danbury, Conn.

[21] Appl. No.: 774,962

[22] Filed: Sep. 11, 1985

[51] Int. Cl.$^4$ ............................................. C08F 283/00
[52] U.S. Cl. .................................... 525/474; 525/446; 528/26; 428/391
[58] Field of Search ................... 525/474, 446; 528/26

[56] References Cited

U.S. PATENT DOCUMENTS

| | | | |
|---|---|---|---|
| 3,296,190 | 1/1967 | Reischl et al. | 260/45.9 |
| 3,579,607 | 5/1971 | Matzner et al. | 260/824 |
| 3,691,257 | 9/1972 | Kendrick et al. | 260/827 |
| 3,701,815 | 10/1972 | Matzner et al. | 528/26 |
| 3,749,757 | 7/1973 | Marzocchi | 260/824 |
| 4,105,567 | 8/1978 | Koerner et al. | 106/287.14 |
| 4,153,640 | 5/1979 | Deiner et al. | 260/46.5 |
| 4,348,510 | 9/1982 | Keck et al. | 528/26 |
| 4,452,962 | 6/1984 | Ginnings et al. | 528/26 |
| 4,496,704 | 1/1985 | Ginnings | 528/27 |

FOREIGN PATENT DOCUMENTS 34568  6/1964  Japan .

Primary Examiner—Melvyn I. Marquis
Attorney, Agent, or Firm—Paul W. Leuzzi, II

[57] ABSTRACT

Polyester resin is modified with siloxane block polymers in such a manner so as to form silicone-modified polyester copolymer domains of controlled size and distribution dispersed in the polyester matrix. These domains undergo microphase segregation and migration during the melt spinning and cold-drawing to the surface of the polyester fiber being formed so as to provide a silicone-sheathed polyester fiber.

60 Claims, 9 Drawing Figures

SILICONE-MODIFIED POLYESTER RESIN AND SILICONE-SHEATHED POLYESTER FIBERS MADE THEREFROM

BACKGROUND OF THE INVENTION

1. Field of Invention

This invention relates to polyester resins which have been modified with siloxane block polymers to obtain copolymers with discrete silicone blocks. The resulting silicone-modified polyester resins maintain the physical properties of a polyester resin and yet subsequent processing exhibits the surface properties of a silicone sheathed material. The invention also relates to fibers made from the silicone-modifed polyester resin and their use in a variety of products.

2. Prior Art

Polyesters have been characterized as heterochain macromolecular compounds that possess a plurality of carboxylate ester groups as components of their skeletal structure as distinguished from other ester-containing polymers, such as cellulose esters, poly(acrylates) and poly(vinyl esters) which have carboxylate groups forming part of pendants from the skeletal structure. Polyesters have found wide utility, being used as fibers, films, plasticizers and polyurethane intermediates to name but a few applications.

Although many reactions are possible for the synthesis of polyesters, conventionally the polyesterification of dicarboxylic acids or their functional derivatives with diols followed by a polycondensation reaction is most widely utilized.

Despite being suitable for many applications, polyesters have been treated with a variety of additives to enhance their physical properties. Silicone has found many uses in conjunction with polyesters, including hydrolytic stability, lubricity, water repellancy and the like. Traditionally, these silicones were applied topically to the finished polyester, see for instance U.S. Pat. No. 4,105,567. However, there has continually been an effort to modify the polyester resin itself in such a way as to provide the polyester resin with the properties of the silicone without adversely affecting its physical characteristics.

An early attempt at such a modification was U.S. Pat. No. 3,296,190 where polyesters were modified with a carbodiimide and a silicone in an effort to stabilize the ester groups from hydrolysis.

Shortly thereafter, two related patents by Union Carbide Corporation, U.S. Pat. Nos. 3,579,607 and 3,701,815, sought to modify the polyester with silicone blocks. This work, as it relates to fibers, suffered from two drawbacks, nitrogen contained in the siloxane blocks was released during copolymerization and discolored the resulting polyester resin and the large amount of silicone employed adversely affected the ability to process fibers.

Polyethylene terephthalate was reported as one of the polymeric materials that could be modified by dispersing polysiloxanes containing polymerized vinyl units, such as styrene, in the preformed organic polymer in U.S. Pat. No. 3,691,257. This patent noted that surface modification of the polymeric material is obtainable and more permanent in nature over topical treatments or simple mixtures when the polymeric material is chemically modified with polysiloxanes.

In U.S. Pat. Nos. 3,674,724 and 3,749,757 polyesters for reinforced elastomers were manufactured by reacting a polycarboxylic acid and a polyol with either an organosilane or a polysiloxane. The silicone-containing material was utilized to provide additional sites for crosslinking the polymeric material to obtain improved tensile strengths under high load.

Acrylic and methacrylic esters were modified with polysiloxanes in U.S. Pat. No. 4,153,640 to obtain modified polymers suitable for treating fibrous materials, including textiles, in an attempt to offer the advantage of water repellancy.

Most recently, a team of scientists at Goodyear Tire and Rubber Company have explored silicone-modification of polyester films as a means to improve the slip characteristics of such films, see U.S. Pat. Nos. 4,348,510, 4,452,962 and 4,496,704. These films are designed to exhibit improved optical clarity for use in visual applications. Here, the silicon atom distribution is inhomogeneous (i.e., there will be local concentrations of dimethylsiloxy mers) while the silicone block distribution is random and hence homogeneous. This type of incorporation will not favor migration of the silicone domains to the surface and can be expected to alter the bulk physical properties of the polyester resin so formed.

Despite numerous references to silicone-containing materials being utilized to modify polyesters in an effort to realize the characteristics obtainable when these same polyesters are treated topically with silicone-containing materials, there continues to be a need for a modified polyester having these attributes which does not suffer from a reduction in its physical properties as a result of incorporating blocks of silicone-containing material into the skeletal structure.

OBJECTIVES OF THE INVENTION

It is a primary object of the present invention to provide a silicone-modified polyester resin where the silicone-containing units are capable of undergoing controlled microphase segregation within the polyester matrix.

It is another object of the present invention that the silicone-containing units be distributed within the polyester matrix in such a manner so that their size and location will not adversely affect the physical properties of the finished polyester.

A further object of the present invention is that the silicone-modified polyester resin be capable of being formed into fibers. These fibers should exhibit improved fiber characteristics relative to fibers made from unmodified polyester, such as lower surface energy, greater lubricity, improved soil release, enhanced softness, greater permanency of the silicone-containing material and the like.

SUMMARY OF THE INVENTION

The present invention provides a silicone-modified polyester resin having discrete domains within the polyester matrix of silicone-containing units derived from polysiloxane block polymers of the general formula

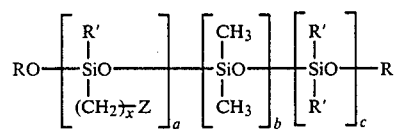

wherein

R is individually a monovalent group selected from the group consisting of alkyl, aryl, acyl, aralkyl and polyoxyalkyl;

R' is individually an alkyl, aryl, alkenyl, or aralkyl group containing from 1 to 8 carbon atoms;

a has a value of 0 to 10;

b has a value of 0 to 50,000;

c has a value of 0 to 1,000; with the proviso that there must be at least 10 silicon atoms in the polysiloxane block polymer;

x has a value of 0, 1, 2 or 3; and

Z is selected from the group consisting of alkyl, aryl, aralkyl, alkoxy, siloxy, acyl, alkenyl and polyoxyalkyl.

The instant invention also provides for fibers made from the silicone-modified polyester resin and those products and uses to which such fibers would advantageously be utilized.

DETAILED DESCRIPTION OF THE INVENTION

Figure 1A:
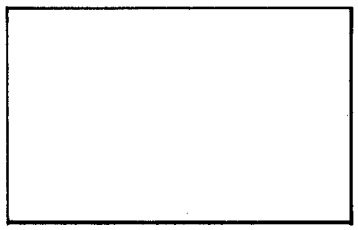
FIG. 1A is a depiction of an unmodified polyester resin.
Figure 1B:
FIG. 1B is a depiction of a fiber made from the unmodified polyester resin shown in FIG. 1A.
Figure 2A:
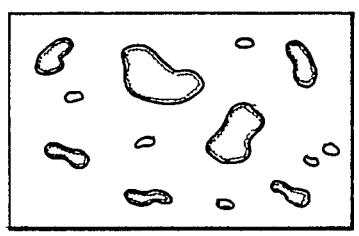
FIG. 2A is a depiction of a silicone-modified polyester resin that had uncontrolled phase segregation resulting in a widely disparate distribution and size of the silicone-containing domains.
Figure 2B:
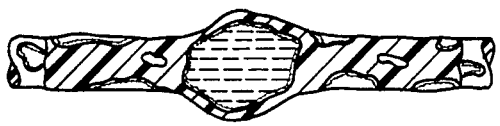
FIG. 2B is a depiction of a fiber made from the silicone-modified polyester resin shown in FIG. 2A. The fiber exhibits slubs.
Figure 3A:
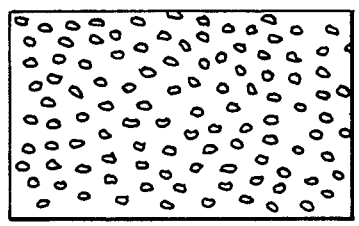
FIG. 3A is a depiction of a silicone-modified polyester resin with controlled phase segregation resulting in discrete silicone-containing domains having uniform distribution and size.
Figure 3B:
FIG. 3B is a depiction of a fiber made from the silicone-modified polyester resin shown in FIG. 3A. The fiber exhibits a silicone sheath.
Figure 4A:
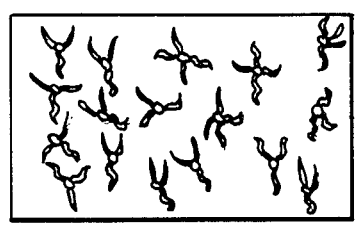
FIG. 4A is a depiction of a silicone-modified polyester fiber with controlled phase segregation resulting in discrete silicone-containing domains having uniform distribution and size where the silicone-containing units making up such domains have specialized pendant groups for performing specific tasks.
Figure 4B:
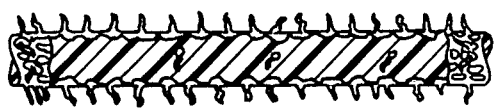
FIG. 4B is a depiction of a fiber made from the silicone-containing polyester resin shown in FIG. 4A. The fiber has pendant groups attached to the silicone sheath.
Figure 5:
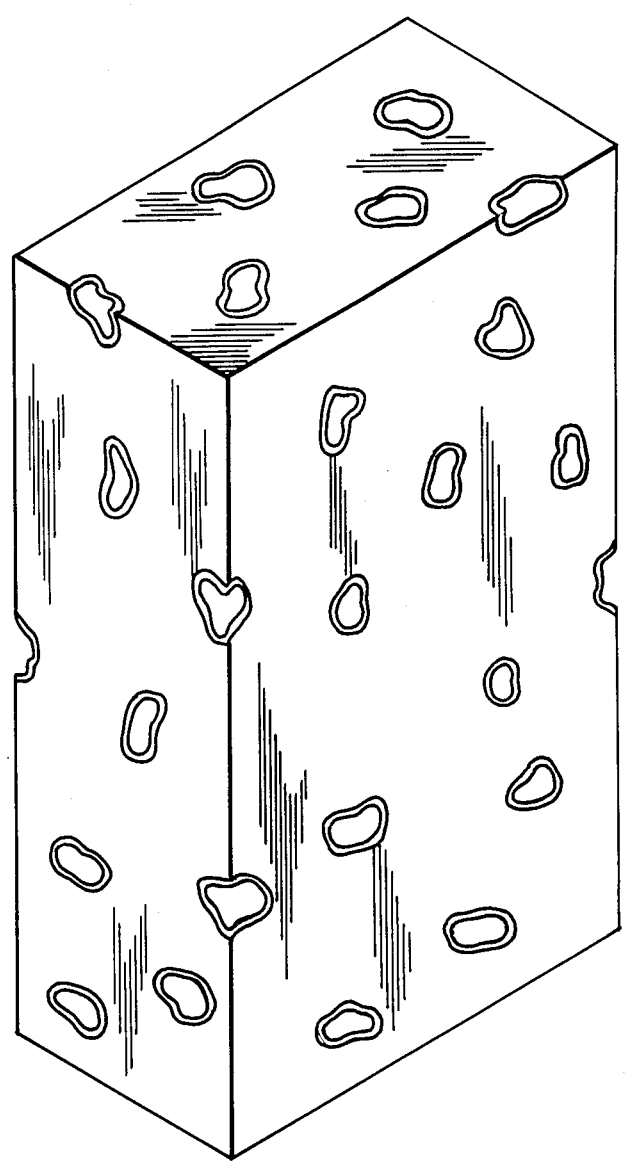
FIG. 5 illustrates a cross-sectional perspective of the silicone-modified polyester resin having polysiloxane block polymer dispersed within a polyester matrix and encapsulated by a silicone-modified polyester copolymer.

In accordance with the present invention, there is provided a silicone-modified polyester resin. The silicone-modified polyester resin can be prepared by conventional processes and techniques employed in the production of unmodified polyester resins. These processes include the older batch process of a catalyzed ester-exchange reaction, a continuous polymerization utilizing an ester-exchange column or a direct-esterification processes. Thus, the modified polyesters are prepared by first subjecting the mixture of reactants from which they are derived to either transesterification or esterification reaction conditions followed by subsequent polycondensation of either the transesterfication or esterification reaction product. In general, the transesterification reaction, involving reaction between a dialkyl ester of a dicarboxylic acid and glycol will be conducted at elevated temperatures ranging from about 170° C. to about 205° C. and preferably from about 185° C. to about 200° C. under an inert gas atmosphere such as nitrogen. In addition, a catalyst will usually be employed to promote the transesterification reaction such as soluble lead and titanium compounds, representatives of which include litharge, lead acetate, glycol titanates, and the like, as well as other well known transesterification catalysts such as compounds of zinc, magnesium, calcium and manganese. In many instances, the zinc and maganese compounds may be preferred.

The esterification reaction involving the reaction between a free dicarboxylic acid and a glycol with the evolution of water also is carried out at elevated temperatures and, in addition, at elevated pressures employing inert gas atmospheres. Usually, the reaction temperatures will range from about 220° C. to about 270° C. and pressures from about 30 to about 40 pounds per square inch (2.0–3.0 kilograms per square centimeter). The reaction can be carried out either in the presence or absence of catalysts. When catalysts are employed, those normally indicated in the art as being useful include compounds of metals such as zinc, lead, antimony, manganese, zirconium, and the like. The reaction can also be carried out in the presence of a low molecular weight polymeric solvent such as described in U.S. Pat. No. 4,020,049.

The polycondensation reaction, the final preparation step in the production of the silicone-modified polyesters of the present invention, is also carried out employing well known techniques and conditions. Thus, in the polycondensation step, elevated temperatures, reduced pressures and inert atmospheres are utilized during the polymerization of the transesterification or esterification reaction product to the desired final product. Temperatures employed in this reaction step will generally range from about 260° C. to about 300° C. and preferably from about 270° C. to about 285° C. while pressures will range from about 1.0 to 0.1 millimeters of mercury pressure. Catalysts useful in promoting the polycondensation include, in addition to the soluble lead and titanium catalysts noted above, various known compounds of antimony, niobium, germanium and the like. Normally, these catalysts will be added to the transesterification or esterification reaction product when the formation of said product is fairly complete and before the polycondensation step is begun.

The critical reactants include an aromatic dicarboxylic acid or its diester, a diol, and a siloxane block polymer.

Suitable aromatic dicarboxylic acids include those having from 8 to 15 carbon atoms or the $C_1$ to $C_4$ dialkyl esters thereof. Representative examples of such aromatic dicarboxylic acids include, but are not limited to, terephthalic acid, dimethylterephthalate, phthalic acid, isophthalic acid, 1,5-naphthalene dicarboxylic acid, 2,6-naphthalene dicarboxylic acid, 4,4'-diphenyl dicarboxylic acid and 4,4'-sulfonyldibenzoic acid. It is preferred that symmetrical aromatic dicarboxylic acids be employed, most preferably terephthalic acid.

Suitable diols include those having from 2 to 20 carbon atoms. Representative examples of such diols include, but are not limited to, (a) aliphatic diols such as ethylene glycol, diethylene glycol, propylene glycol, 1,4-butanediol, 1,8-octanediol, decamethylene glycol and the like;

(b) branch chain diols such as neopentyl glycol, 2-methyl-2-ethyl propane diol-1,3 and 2,2-diethyl propane diol-1,3;

(c) cycloalkane diols such as cyclohexane dimethanol;

(d) bis-(hydroxyphenyl)alkanes such as 2,2-bis-(4-hydroxyphenyl)propane,
2,4'-dihydroxydiphenyl-methane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane and the like;

(e) di(hydroxyphenyl)sulfones such as bis-(4-hydroxyphenyl)sulfone, 2,4'-hydroxydiphenyl sulfone, 5'-chloro-2,4'-dihydroxydiphenyl sulfone, 5'-chloro-4,4'-dihydroxydiphenyl sulfone, and the like; and (f) di(hydroxyphenyl)ethers such as bis-(4-hydroxyphenyl)ether, the 4,3'-, 4,2'-, 2,2'-, 2,3'-dihydroxydiphenyl ethers,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,6-dimethyldiphenyl ether,
4,4'-dihydroxy-2,5-diethoxydiphenyl ether and the like.

Suitable siloxane block polymers are represented by the general formula

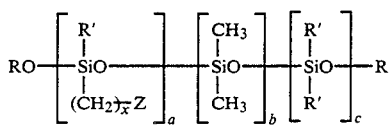

wherein R is individually a monovalent group selected from the group consisting of alkyl, aryl, acyl, aralkyl and polyoxyalkyl. R cannot be hydrogen. This R group will ultimately be liberated to form an alcohol in the first stage of the preparation of the silicon-modified polyester resin and thus, in some instances, it may be desirable that the alcohol so formed be capable of removal by distillation. In those instances it is preferred that R contain no more than 18 carbon atoms, more preferably 12 carbon atoms or less. In one aspect of the present invention, the proper choice of the R group will affect the solubility of the siloxane block polymer in the nascent polyester matrix. In those instances where the solubility of the siloxane-block polymer is a concern, the R group needs to be oleophilic in nature. Illustrative of such oleophilic R groups are 2-ethylhexyl, decyl, benzyl and polyoxypropyl;

$R^1$ is individually a monovalent group selected from the group consisting of alkyl, aryl, alkenyl and aralkyl groups containing from 1 to 8 carbon atoms. Once again, when solubility is a concern the $R^1$ pendant group should be oleophilic in nature, such as phenyl, phenethyl or ethyl;

Z is selected from the group consisting of alkyl, aryl, aralkyl, alkoxy, polyoxyalkyl, alkenyl and siloxy with the proviso that when Z is siloxy x must equal zero. The Z group preferably contains from 1 to 25 carbon atoms, more preferably from 1 to 15 carbon atoms. The Z group may be substituted or unsubstituted, with halogen, cyano, amino, carboxy, sulfonate, alkylmercapto and hydroxy groups the preferred substituents. In those instances where Z is substituted with an amino, carboxy or hydroxy group the value of a should be 3 or less to avoid unwanted crosslinking. Another aspect of the invention requires that in some instances, Z be an oleophilic group so as to enhance the solubility of the polysiloxane block polymer in the nascent polyester matrix;

a has a value of 0 to 10, preferably 0 to 5;
b has a value of 0 to 50,000, preferably 10 to 10,000 and most preferably 50 to 200;
c has a value of 0 to 1,000, preferably 0 to 100; and
x has a value of 0, 1, 2 or 3.

The value of a, b, and c should be such that the polysiloxane block polymer contains at least 10 silicon atoms, preferably at least 50 silicon atoms.

Suitable siloxane block polymers and modified block polymers include but are not limited to, diethoxy polydimethylsiloxane,
bis-(2-ethylhexyloxy)polydimethylsiloxane,
bis-(hydroxyethyloxy)polydimethylsiloxane,
bis-(butyroxy)polydimethylsiloxane,
dibenzyloxy polydimethylsiloxane,
didodecyloxy polydimethylsiloxane,
diethoxy poly(dimethyl)(methylethyl)siloxane,
diethoxy poly(dimethyl)(methylbutyl)siloxane,
diethoxy poly(dimethyl)(dihexyl)siloxane,
diethoxy poly(dimethyl)(methyl phenyl)siloxane,
dibutoxy polydiethylsiloxane,
diphenoxy poly(dimethyl)(methylhexyl)siloxane,
bis-(2-ethylhexyloxy)poly(dimethyl)(methyl octyl)siloxane,
diethoxy poly(dimethyl)(methylhexyl)(methyl octadecyl)siloxane,
diethoxy poly(dimethyl)(methyl chloropropyl)siloxane,
diethoxy poly(dimethyl)(methyl morpholinopropyl)siloxane,
diethoxy poly(dimethyl)(methyl cyanopropyl)siloxane,
diethoxy poly(dimethyl)(methyl trifluoropropyl)siloxane,
diethoxy poly[dimethyl][methyl(butoxyethyloxy)propyl]siloxane,
diethoxy poly[dimethyl][methyl][methoxy(triethyloxy)propyl]siloxane,
diethoxy poly[dimethyl][methyl poly(propyloxy)propyl]siloxane,
bis(methoxyethyloxy)poly(dimethyl)(methylbutyl)siloxane,
tetraethoxy bis(methyl)polydimethylsiloxane, and triethoxy(decyl)polydimethylsiloxane.

The relative amount of each reactant to one another is of critical importance. This is especially true of the siloxane block copolymer reactant since too much will adversely affect the physical properties of the polyester whereas too little will not provide the surface characteristics desired. Thus, relative to the aromatic dicarboxlic acid, the diol should be present in either a stoichometric amount or in excess, it being preferred to utilize an excess of the diol. The siloxane block copolymer should be present in an amount sufficient to obtain from 0.1 to 10 weight percent, based on the total reaction product, of silicone-containing units in the polyester matrix preferably 0.5 to 5 weight percent.

The resulting silicone-modified polyester resin is believed to contain from two to three separate regions, a polyester matrix comprising the reaction product of the aromatic dicarboxylic acid and diol; microdomains of polysiloxane block polymers dispersed within the polyester matrix, which in preferred embodiments are so small as to be considered absent altogether; and silicone-modified polyester forming a barrier region between the microdomains dispersed within polyester matrix and the polyester matrix itself.

The distribution and size of the silicone domains within the polyester matrix are essential to the polyester resin and the fiber made therefrom. As previously noted, if the size is too large, the physical properties of the polyester are adversely affected, if too small, the polyester does not exhibit the distinguishing characteristics over an unmodified polyester resin. In addition, the presence of the dispersed domains provides a delustering of the resin. The size and distribution can be controlled by three known parameters although other methods may become apparent to those skilled in the art. First, by providing high speed agitation during the polyester formation the size of the silicone domains is reduced and uniformly dispersed within the polyester matrix. The agitation rate should be increased approximately five fold over what would be necessary for an unmodified polyester resin. Secondly, by proper choice of the endblock on the siloxane block polymers, the solubility of the polysiloxane block polymer within the nascent polyester matrix can be enhanced. Thus oleophilic end groups are preferred. The greater the solubility, the smaller and more uniform the size and distribution of the silicone-containing domains. Finally, the skeletal structure of the siloxane block polymer can be modified by attaching pendant groups to enhance its solubility. Despite desiring increased solubility, too much solubility will generate such small domains that the beneficial characteristics silicone-modification provides will not be apparent. The silicone-containing domains should not exceed one-fourth the size of the spinneret opening. In practice, it is believed the silicone-containing domains should be from about 0.05 microns to 6 microns in average size, preferably about 0.1 to 1 microns.

The silicone-modified polyester resin can be chipped to form pellets for melt spinning at a later time or can in some continuous systems be subjected to direct melt spinning. In either event, spinning is required to take the silicone-modified polyester resin and turn it into a polyester fiber. Melt spinning consists of extrusion through a capillary to form a filamentary stream followed by stretching and cooling of the fiber so made. It is during the extrusion stage of fiber formation that some of the advantages of having a silicone-modified polyester resin first become apparent.

By careful control of the size and distribution of the silicone-containing domain, migration of the domain within the polyester matrix initially takes place during the extrusion stage. Here the microdomain migrates to the outside of the forming fiber releasing the entrapped polysiloxane block polymer to the interface akin to a topical finish of silicone lubricants. At the same time, the silicone-modified polyester which has encapsulated the polysiloxane block polymer domains also migrates to the outside of the forming fiber to create a silicone-modified polyester sheath around the polyester matrix. This sheath, being chemically bound to the rest of the polyester fiber, provides a permancy for those silicone-related characteristics to the fiber. If the domains are large, the center region of the domain will contain polysiloxane block polymer which is not chemically linked to the polyester matrix. This free polysiloxane block polymer will potentially be lost to solvent extraction. Also, if the domain is too large (i.e., on the order of the fiber diameter) it will interfere with melt spinning by either causing a slub-like structure or, in the extreme, cause fiber breakage. Preferably, the domains are small enough so that the endgroups of all of the polysiloxane block polymer have an opportunity to condense with the polyester, thus no free polysiloxane block polymer would be present but rather only copolymer between the polyester matrix and siloxane block copolymer. Although it is known that silicone, having a low surface energy, will preferentially occupy a surface geometry and thus tend to migrate to the air-solid or air-liquid interface when present, the art suggests that for the silicone to migrate in such a manner it needs to be free, that is, not chemically bound to the matrix. Thus, it was totally unexpected that, in contrast to these expectations, the silicone-modified polyester heterogenite would be capable of migration.

The melt spinning operation utilized is conventional and, as such, is typically characterized by forcing the silicone-modified polyester resin at a temperature above its melting point, but below so high a temperature as to favor thermal degradation, such as 250° C. to 350° C., through a sand-bed filter to a steel spinneret containing openings. The resin throughput is controlled by a gear pump which is capable of also generating the necessary pressure required to force the polymer through the filter-spinner assembly. The extruded fiber is then stretched to obtain an ordered crystalline structure and cooled, usually by a forced air quench system. Surprisingly, the migration of the silicone domains has been found to continue during the drawing, including cold drawing, of the fiber where the fiber is much more solid than in the melt-spinning operation. The silicone-modified polyester fiber so made should have a weight average molecular weight in the range of 10,000 to 200,000, preferably in the range of 15,000.

The silicone-modified polyester fiber produced in accordance with the present invention finds utility in a number of diverse applications. Staple, cut from tow, represents one of the largest uses silicone-modified polyester fibers can be employed in. Here blends of the silicone-modified polyester fiber may be made with either cotton or wool. Yarns are another important area where silicone-modified polyester fibers can be utilized, in particular industrial yarns for automobile tires, safety belts, fire hoses and the like or textile filament yarns for knitted or woven fabrics. Fiberfill is yet another application in which silicone-modified polyester fibers in staple or tow form will find utility in sleeping bags, pillows, garment insulation and the like. Other areas of potential use include carpet fiber, shoe linings, electrical insulation, diaper coverstock and the like.

Another aspect of the present invention provides a silicon-modified polyester resin or fiber having reactive pendant groups available on its surface for subsequent reaction with other chemicals or substances. This "lock and key" approach allows the polyester to have a pendant modifying group chemically bonded to it (the "lock") which can interact with any of a variety of chemicals or substances (the "key") to alter the fibers properties, i.e., dyes, flame retardants, lubricants, etc.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLE A

Unmodified Poly(ethylene terephthalate) Resin

A glass reactor was equipped with a mechanical stirrer (model HST 20; G. K. Heller Corp.,) condenser, and nitrogen sparge. To this reactor was charged 737 grams of dimethylterephthalate (DMT) and 585 grams of ethylene glycol (EG). Then, 0.22 grams of manganese acetate and 0.29 grams of antimony trioxide were added as catalysts. Using an oil bath filled with UCON TM HTF-30 (Union Carbide, Danbury, Conn.), reactor temperature was raised to 180°–185° C. and maintained at this temperature for approximately 2.5 hours to effect transesterification. After 2.5 hours, approximately 85 percent of the theoretical quantity of methanol had been trapped in the distillation receiver, which was cooled with dry ice/acetone. Percent methanol was determined by refractive indices of distillate corrected for EG contamination. Once approximately 85 percent of the theoretical methanol had been collected, the temperature was raised to 240° C. and maintained for approximately 1 hour. At the end of this interval, an additional 15 percent of theoretical methanol had been collected. Thus, at the end of transesterification, approximately 100 percent of theoretical methanol had been collected. At this point, after the nitrogen sparge and receiver containing methanol were removed, the mechanical stirrer was turned on and adjusted to a speed of 50 rpm. A fresh distillation receiver was attached to the reactor system. Then, pressure was gradually reduced to approximately 0.5 mm Hg while reaction temperature was raised to 280° C. After approximately 150 minutes, stirrer torque had increased from 3.5 pounds-inch to 5.8–6.0 pounds-inch. Reaction pressure was then raised to atmospheric by bleeding in nitrogen. The intrinsic viscosity of this resin (measured in a solvent of 1 part by weight of trifluoroacetic acid and 3 parts by weight of dichloromethane) was 0.63.

EXAMPLE B

Synthesis of

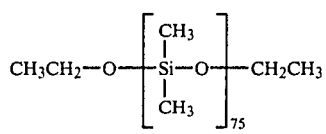

A five-liter three-neck flask was equipped with the following: (1) thermometer equipped with a Thermowatch TM temperature controller, (2) reflux condenser, (3) positive nitrogen pressure system, (4) mechanical stirrer. To this apparatus, 373 grams of

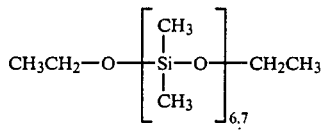

2627 grams of cyclooctamethyltetrasiloxane (tetramer) and 30 grams of tetramethylammonium hydroxide were charged and maintained at 95° C. for approximately 16 hours. Then, the reaction temperature was raised to 150° C. for one hour and purged with nitrogen for 4 hours. The refractive index of the final product was 1.403 at 25° C. With a Brookfield Viscometer (Model LUT; spindle #2 at 60 rpm), the viscosity was 118 cps. Gel permeation chromatography indicated only one major component.

EXAMPLE C

Synthesis of

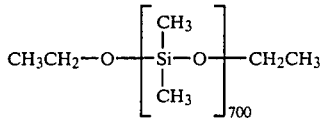

The procedure of Example B was followed with the exception that the following reactants were charged:

| | |
|---|---|
| Cyclooctamethyltetrasiloxane (Tetramer) | 592 grams |
| $CH_3CH_2-O-\left[\begin{array}{c} CH_3 \\ \| \\ Si-O \\ \| \\ CH_3 \end{array}\right]_{6.7}-CH_2CH_3$ | 8.3 grams |
| Tetramethylammonium hydroxide | 6.0 grams |

EXAMPLE D

Synthesis of

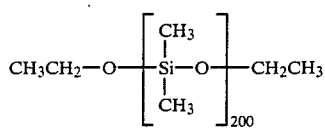

The procedure of Example B was followed with the exception that a 2-liter flask was used. The following reactants were charged:

| Cyclooctamethyltetrasiloxane (Tetramer) | 913 grams |
| --- | --- |
| CH$_3$CH$_2$—O—[Si(CH$_3$)$_2$—O]$_9$—CH$_2$CH$_3$ | 47 grams |
| Tetramethylammonium hydroxide | 4.8 grams |

The refractive index (25° C.) was 1.3954, viscosity was 772 cps. Gel permeation chromatography indicated only one major component.

EXAMPLE E

Synthesis of

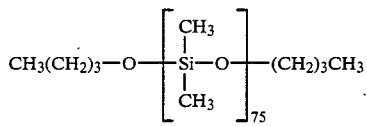

(a) (CH$_3$)$_2$Si[O(CH$_2$)$_3$CH$_3$]$_2$

Endblocker

A two-liter three-neck round bottom flask was equipped with a mechanical stirrer, condenser, addition funnel and heating mantle. To the reaction vessel there was added 444 grams of n-butanol which was brought to a temperature of 40° C. Then, 258 grams of (CH$_3$)$_2$Si(Cl)$_2$ were added dropwise over a period of three hours. After the addition had been completed, the reaction mixture was allowed to stir for 12 hours at 22° C. Using atmospheric fractional distillation, 270 grams of product with a boiling point of 190°-192° C. was isolated.

(b)

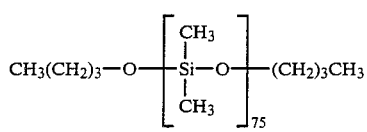

The procedure of Example B was followed with the exception that the following reactants were charged:

| (CH$_3$)$_2$Si[O(CH$_2$)$_3$CH$_3$]$_2$ | 913 grams |
| --- | --- |
| Tetramer | 555 grams |
| Tetramethylammonium hydroxide | 6.0 grams |

The refractive index was (25° C.) 1.405; viscosity was 93 cps. Gel permeation chromatography indicated only one major component. Nuclear magnetic resonance (NMR) indicated the structure of the final product was

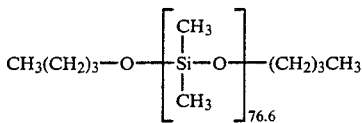

EXAMPLE F

Synthesis of

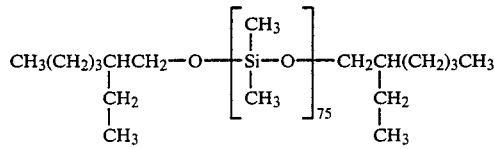

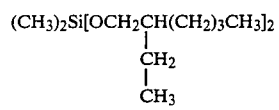

Endblocker

The procedure of Example E(a) was followed with the exception that the following reagents were charged:

| 2-ethyl-1-hexanol | 677 grams |
| --- | --- |
| (CH$_3$)$_2$Si(Cl)$_2$ | 258 grams | thereafter 494 grams of product with a boiling point of 141° C. (0.2 mm Hg) were isolated by fractional distillation.

(b)

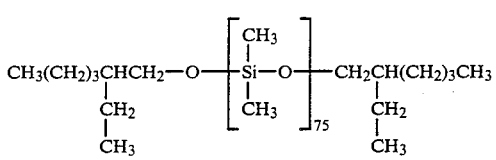

The procedure of Example E(b) was followed with the exception that the following reactants were charged:

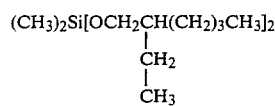

| | 63 grams |
| --- | --- |
| Tetramer | 1,100 grams |
| Tetramethylammonium hydroxide | 12.0 grams |

The final product's refractive index was (25° C.) 1.406; viscosity was 110 cps. Gel permeation chromatography indicated only one major component. NMR indicated the structure of the final product was

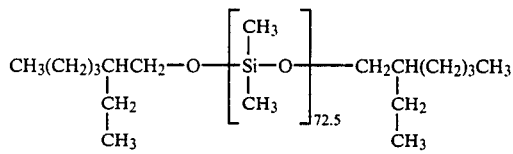

EXAMPLE G

Synthesis of

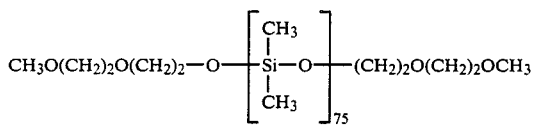

(a) $(CH_3)_2Si[O(CH_2)_2O(CH_2)_2OCH_3]_2$

Endblocker

The procedure of Example E(a) was followed with the exception that the following reactants were charged:

| | |
|---|---|
| $CH_3O(CH_2)_2O(CH_2)_2OH$ | 937 grams |
| $(CH_3)_2Si(Cl)_2$ | 387 grams | thereafter 652 grams of product with a boiling point of 123°–125° C. (0.1 mm Hg) was isolated by fractional distillation.

(b)

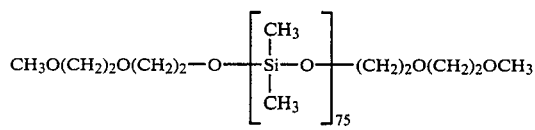

The procedure of Example E(b) was followed with the exception that the following reactants were charged:

| | |
|---|---|
| $(CH_3)_2Si[O(CH_2)_2O(CH_2)_2OCH_3]_2$ | 29.6 grams |
| Tetramer | 555 grams |
| Tetramethylammonium hydroxide | 6 grams |

The refractive index of the final product was 1.404; viscosity was 50.6 cps.

EXAMPLE H

Synthesis of

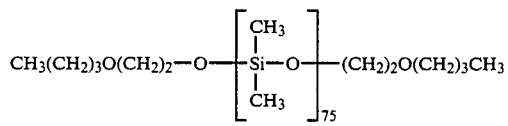

(a) $(CH_3)_2Si[O(CH_2)_2O(CH_2)_3OCH_3]_2$

Endblocker

The procedure of Example E(a) was followed with the exception that the following reactants were charged:

| | |
|---|---|
| $(CH_3)_2Si(Cl)_2$ | 129 grams |
| $CH_3(CH_2)_2O(CH_2)_2OH$ | 307 grams | thereafter 222 grams (B.P. 190° C. at 28 in Hg) of final product was isolated by fractional distillation.

(b)

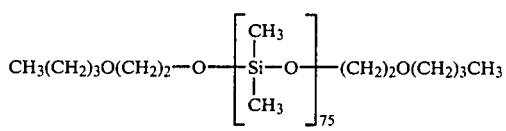

The procedure of E(b) was followed with the exception that the following reactants were charged:

| | |
|---|---|
| $(CH_3)_2Si[O(CH_2)_2O(CH_2)_3CH_3]_2$ | 58.4 grams |
| Tetramer | 1,100 grams |
| Tetramethylammonium hydroxide | 11.7 grams |

The refractive index (25° C.) was 1.406; viscosity was 115 cps. Gel permeation chromatography indicated only one major component. NMR indicated the structure of the final product was:

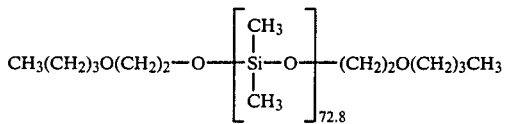

EXAMPLE I

Synthesis of

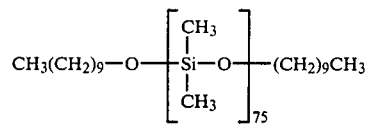

(a) $(CH_3)_2Si[O(CH_2)_9CH_3]_2$

Endblocker

The procedure of Example E(a) was followed with the exception that the following reactants were charged:

| | |
|---|---|
| $(CH_3)_2Si(Cl)_2$ | 67 grams |
| $CH_3(CH_2)_9OH$ | 165 grams | thereafter 125 grams of product (B.P. 265° C. 25 in Hg) were isolated by fractional distillation.

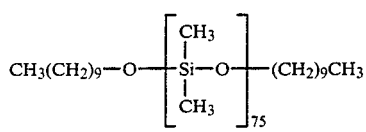

(b)

The procedure of E(b) was followed with the exception that the following reactants were charged:

| (CH₃)₂Si[O(CH₂)₉(CH₃)]₂ | 37.3 grams |
| Tetramer | 555 grams |
| Tetramethylammonium hydroxide | 6 grams |

The final product's refractive index was (25° C). 1.409; viscosity was 99 cps.

EXAMPLE J

Preparation of Modified Siloxane-Block Polymers

A round bottom flask was equipped with a mechanical stirrer and nitrogen inlet. The flask was charged with 414.0 grams of octamethylcyclotetrasiloxane, 88.8 grams of

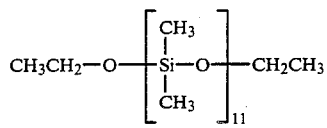

119.0 grams of hexamethyldiphenethylcyclotetrasiloxane and 3.0 grams of tetramethylammonium silanolate. After flushing with nitrogen the reaction mixture was heated to 90° C. and maintained at the temperature for 30 hours under nitrogen. The temperature was then increased to 150° C. for 1 hour. The temperature was decreased to 110° C. and the volatiles were removed by vacuum. After cooling under vacuum to room temperature, the fluid was pressure filtered through a 0.1μ pad.

Gel permeation chromatography indicated only one major component. NMR indicated the structure of the final product was:

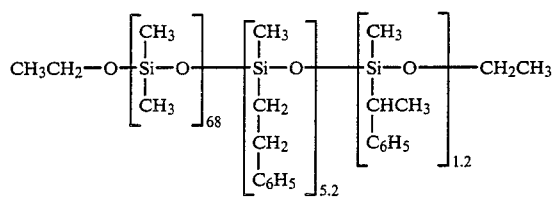

The index of refraction (25° C.) was 1.4225; viscosity was 150 cps.

EXAMPLE K

Preparation of Modified Siloxane-Block Polymers

The procedure of Example J was followed with the exception that 300.6 grams of cyclic tetramer, 59.1 grams of

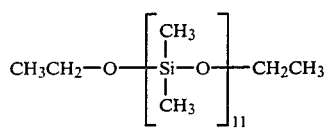

65.9 grams of octaphenylcyclotetrasiloxane and 3.1 grams of tetramethylammonium silanolate were charged to the reaction flask. Gel permeation chromatography indicated only one major component. NMR indicated the structure of the final product was:

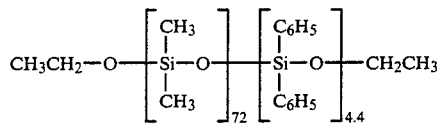

The index of refraction (25° C.) was 1.4315; viscosity was 180 cps.

EXAMPLE L

Preparation of Modified Siloxane Block Polymers

A round bottom flask was equipment with a mechanical stirrer and nitrogen inlet. The flask was charged with 266.4 grams of cyclic tetramer, 13.1 grams of phenylmethyldiethoxysilane, 75 ml ethanol, 0.9 grams potassium hydroxide, and 0.9 grams H₂O. This mixture was refluxed under nitrogen for 8 hours and then the ethanol was distilled off. The temperature of the reaction mixture was increased to 150° C. and stirred under nitrogen for 20 hours. The reaction was cooled to 90° C. and 3.0 grams of acetic acid was added and stirred for 1 hour. The volatiles were then stripped off by vacuum at 110° C. The fluid was cooled under vacuum and then pressure filtered through a 0.1μ pad.

Gel permeation chromatography indicated only one major component. NMR indicated the structure of the final product was:

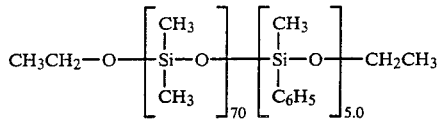

The index of refraction (25° C.) was 1.4185; viscosity was 60 cps.

EXAMPLE M

Preparation of Modified Siloxane Block Polymers

The procedure in Example L was followed except 213 grams of cyclic tetramer, 10.0 grams of 3-cyanopropylmethyldiethoxysilane, 0.72 grams H₂O, 75 ml of CH₃CH₂OH and 1.2 grams KOH.

Gel permeation chromatography indicated only one major component. NMR indicated the structure of the final product was:

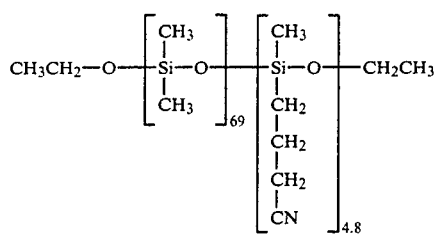

The index of refraction (25° C.) was 1.406; viscosity was 76 cps.

EXAMPLE N

Preparation of Modified Siloxane Block Polymers

The procedure of Example J was followed with the exception that 174.6 grams of cyclic tetramer, 35.5 grams of

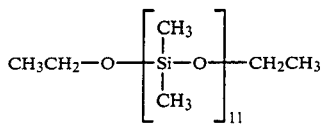

28.8 grams of tetrahexyltetramethylcyclotetrasiloxane (prepared by the hydrolysis of hexylmethyldichlorosilane) and 2.0 grams of tetramethylammonium silanolate were charged to the reaction flask. Gel permeation chromatography indicated only one major component. The structure of the final product was

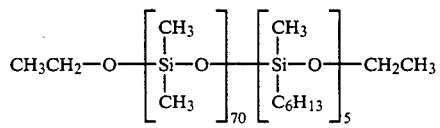

The index of refraction (25° C.) was 1.4095; viscosity was 260 cps.

EXAMPLE O

Preparation of Modified Siloxane Block Polymers

The procedure of Example J was followed with the exception that 174.6 grams of cyclic tetramer, 35.5 grams of

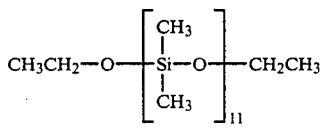

34.4 grams of tetraoctyltetramethylcyclotetrasiloxane (prepared by the hydrolysis of octymethyldichlorosilane) and 2.0 grams of tetramethylammonium silanolate were charged to the reaction flask. Gel permeation chromatography indicated only one major component. The structure of the final product was

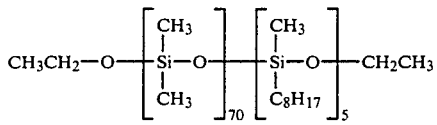

The index of refraction (25° C.) was 1.408; viscosity was 140 cps.

EXAMPLE P

Preparation of Modified Siloxane Block Polymer

The procedure of Example J was followed with the exception that 174.6 grams of cyclic tetramer, 35.5 grams of

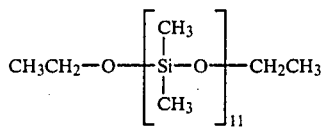

40.0 grams of tetradecyltetramethylcyclotetrasiloxane (prepared by the hydrolysis of decylmethyldichlorosilane) and 2.0 grams of tetramethylammonium silanolate were charged to the reaction flask. Gel permeation chromatography indicated only one major component. The structure of the final product was:

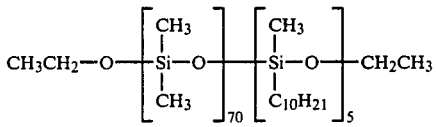

The index of refraction (25° C.) was 1.4158; viscosity was 96 cps.

EXAMPLE Q

Preparation of Modified Siloxane Block Polymer

The procedure of Example J was followed with the exception that 218.3 grams of cyclic tetramer, 44.4 grams of

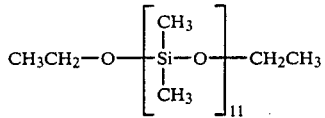

57.0 grams of tetradodecyltetramethylcyclo tetrasiloxane (prepared by hydrolysis of dodecylmethyldichlorosilane) and 2.0 grams of tetramethylammonium silanolate were charged to the reaction flask. Gel permeation chromatography indicated only one major component. The structure of the final product was:

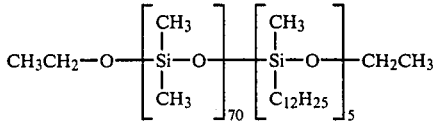

The index of refraction (25° C.) was 1.413; viscosity was 40 cps.

EXAMPLE R

Preparation of Modified Siloxane Block Polymer

The procedure of Example J was followed with the exception that 130.9 grams of cyclic tetramer, 26.6 grams of

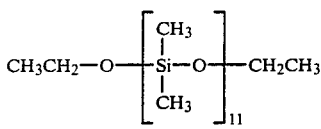

46.8 grams of tetramethyltetraoctadecylcyclcylotetrasiloxane (prepared by hydrolysis of methyloctadecyclodichlorosilane) and 2.0 grams of tetramethylammonium silanolate were charged to the reaction flask. Gel permeation chromatography indicated only one major component. The structure of the final product was

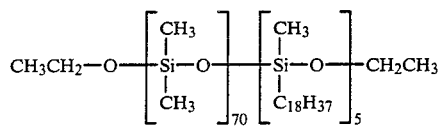

The index of refraction (25° C.) was 1.4195

EXAMPLE S

Preparation of Modified Siloxane Block Polymer

The procedure of Example J was followed with the exception that 155.5 grams of cyclic tetramer, 44.4 grams of

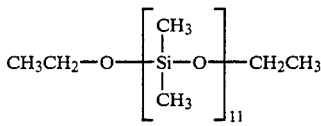

39.0 grams of (3,3,3-trifluoropropyl)methyl siloxane and 2.0 grams of tetramethylammonium silanolate were charged to the reaction flask. Gel permeation chromatography indicated only one major component. The structure of the final product was

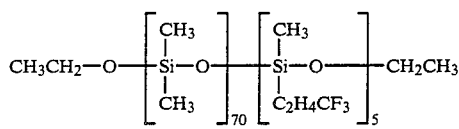

The index of refraction (25° C.) was 1.4005; viscosity was 320 cps.

EXAMPLE T

Preparation of Modified Siloxane Block Polymers

The procedure of Example L was followed with the exception that 103.6 grams of cyclic tetramer, 56.1 grams of (heptadecafluoro-1,1,2,2-tetrahydrodecyl)-1-methyldichlorosilane, 50 ml of ethanol, 11.5 grams of potassium hydroxide and 0.29 grams of H₂O were charged to the reaction flask. Gel permeation chromatography indicated only one major component. The structure of the final product was:

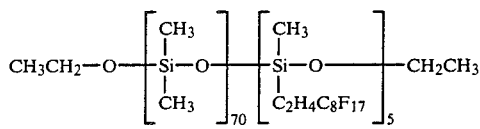

The index of refraction (25° C.) was 1.405; viscosity was 320 cps.

EXAMPLE U

Preparation of Modified Siloxane Block Polymers

The procedure of Example J was followed with the exception that 218.3 grams of cyclic tetramer, 44.4 grams of

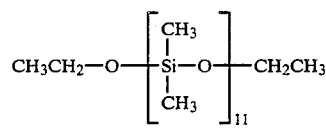

22.0 grams of tetramethyltetramethylcyclotetrasiloxane (prepared by the hydrolysis of ethylmethyldichlorosilane) and 2.0 grams of tetramethylammonium silanolate were charged to the reaction flask. Gel permeation chromatography indicated only one major component. The structure of the final product was

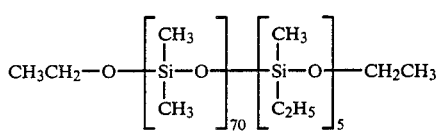

The index of refraction (25° C.) was 1.4045; viscosity was 130 cps.

EXAMPLE V

Preparation of Modified Siloxane Block Polymers

The procedure of Example J is followed with the exception that 261.9 grams of cyclic tetramer, 53.3 grams of

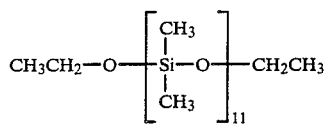

30.6 grams of tetraallyltetramethylcyclosiloxane (prepare by the hydrolysis of allylmethyldichlorosilane) and 2.0 grams of tetramethylammonium silanolate are charged to the reaction flask. Only one major component is anticipated, the final structure of which is

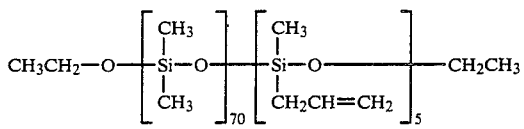

EXAMPLE W

Preparation of Modified Siloxane Block Polymer

The procedure of Example J was followed with the exception that 112.7 grams of cyclic tetramer, 21.1 grams of

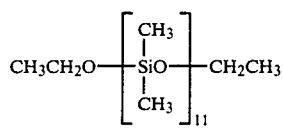

22.2 grams of tetramethyltetra-3-pyrollidinylpropylcyclo-tetrasiloxane prepared by the hydrolysis of 3-pyrollidinylpropylmethyl-dichloxysilane [(prepared by the hydroxilylation of N-allypyrollidine amd diethoxymethylsilane)] and 2.0 grams of tetramethylammonium silanolate were charged to the reaction flask. Gel permeation chromatography indicated only one major product. The structure of the final product was

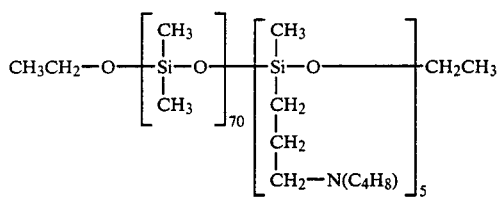

The index of refraction (25°) was 1.4165; the viscosity was 260 cps.

EXAMPLE X

Preparation of Modified Siloxane Block Polymers

The procedure of Example J is followed with the exception that 261.9 grams of cylic tetramer, 53.3 grams of

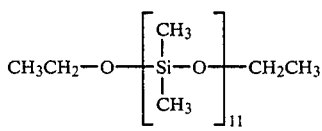

41.3 grams of tetra-(3-chloropropyl)tetramethylcyclotetrasiloxane (prepared by the hydrolysis of 3-chloropropylmethyldichlorosilane) and 2.0 grams of tetramethylammonium silanolate were charged to the reaction flask. Only one major component is anticipated, the final structure of which is

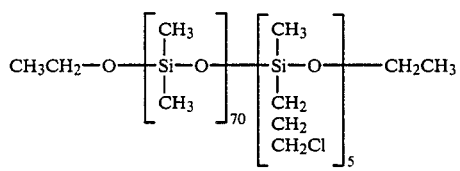

EXAMPLE Y

Preparation of Modified Siloxane Block Polymers

The procedure of Example J was followed with the exception that 56.5 grams of cyclic tetramer, 13.6 grams of

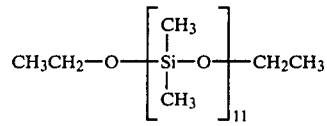

18.0 grams of tetramethyltetra(butoxyethyloxy)propyl-cyclotetrasiloxane (prepared by the hydrolysis of the hydrosilylation product of diethoxymethylsilane and butoxyethyl oxyprop-1-ene and 1.0 grams of tetramethylammonium silanolate were charged to the reaction flask. Gel permeation chromatography indicated only one major component. The structure of the final product was

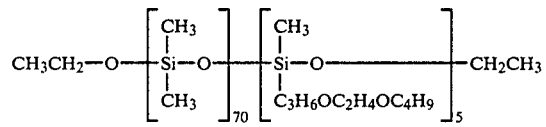

The index of refraction (25° C.) was 1.4134; viscosity was 280 cps.

EXAMPLE Z

Preparation of Modified Siloxane Block Polymers

The procedure of Example L was followed with the exception that 155.4 grams of cyclic tetramer, 2.0 grams of potassium hydroxide, 50.7 grams of methoxy(triethyloxypropyl)methyldiethoxysilane (prepared by the hydrosilylation of methyldiethoxysilane and allylmethoxytriglycol (AMTG)), 100 mls of ethanol and 21.6 grams of H2O were charged to the reaction flask. Gel permeation chromatography indicated there was only one major product. The structure of the final product was

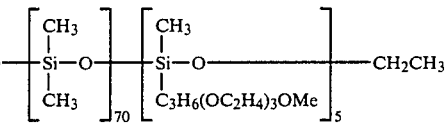

The index of refraction (25° C.) was 1.440; viscosity was 70 cps.

EXAMPLE AA

Preparation of Modified Siloxane Block Polymers

The procedure of Example L was followed with the exception that 103.6 grams of cyclic tetramer, 49.8 grams of methoxy(polyethyloxypropyl)methyldiethoxysilane (prepared by the hydrosilylation of methyldiethoxysilane and allyl(methoxypolyethylene glycol)-(APEG) 2.0 grams of potassium hydroxide, 75 mls. of ethanol and 1.44 grams of H2O were charged into the reaction flask. Gel permation chromatography indicated only one major product. The structure of the final product was

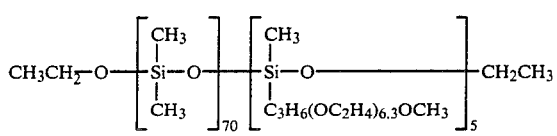

The index of refraction (25° C.) was 1.415; viscosity was 420 cps.

EXAMPLE BB

Preparation of Modified Siloxane Block Polymers

The procedure of Example L was followed with the exception that 55.4 grams of cyclic tetramer, 22.5 grams of methoxy(polypropyloxypropyl)methyldiethoxysilane (prepared by the hydrosilylation of methyldiethoxysilane and allyl(methoxypolypropylene glycol) (APPG)), 0.5 grams of potassium hydroxide, 65 mls of ethanol and 0.187 grams of H₂O were charged to the reaction flask. Gel permeation chromatography indicated only one major product. NMR indicated the structure of the final product was:

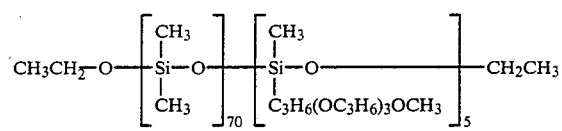

The index of refraction (25° C.) was 1.411; viscosity was 300 cps.

EXAMPLE CC

Preparation of Modified Siloxane Block Polymers

The procedure of Example J was followed with the exception that 136.5 grams of cyclic tetramer, 26.6 grams of

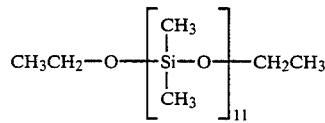

15.5 grams of tetradodecyltetramethylcyclotetrasiloxane (prepared by the hydrolysis of dodecylmethyldichlorosilane) and 2.0 grams of tetramethylammonium silanolate were charged to the reaction flask. Gel permeation chromatography indicated only one major product. The structure of the final product was

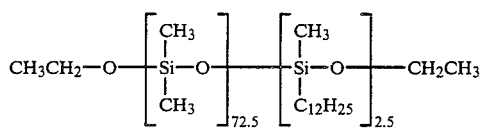

The index of refraction (25° C.) was 1.4103; viscosity was 60 cps.

EXAMPLE DD

Preparation of Modified Siloxane Block Polymers

The procedure of Example J was followed with the exception that 83.6 grams of cyclic tetramer, 17.8 grams of

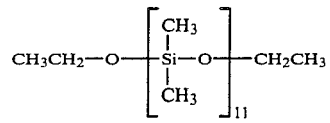

35.3 grams of tetradodecyltetramethylcyclotetrasiloxane (prepared by the hydrolysis of dodecylmethyldichlorosilane) and 2.0 grams of tetramethylammonium silanolate were charged to the reaction flask. Gel permeation chromatography indicated only one major product. NMR indicated the structure of the final product was:

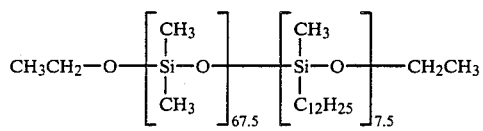

The index of refraction (25° C.) was 1.418; the viscosity was 180 cps.

EXAMPLE EE

Preparation of Modified Siloxane Block Polymers

The procedure of Example J was followed with the exception that 130.9 grams of cyclic tetramer, 26.6 grams of

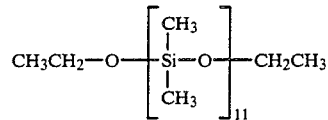

23.4 grams of tetramethyltetraoctodecylcyclotetrasiloxane (prepared by the hydrolysis of octodecylmethyldichlorosilane), 10.8 grams of tetrahexyltetramethylcyclotetrasiloxane (prepared by the hydrolysis of hexylmethyldichlorosilane) and 2.0 grams of tetramethylammonium silanolate were charged to the reaction flask. Gel permeation chromatography indicated only one major product. The structure of the final product was

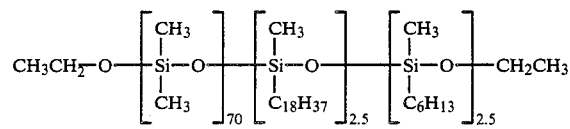

The index of refraction (25° C.) was 1.416; viscosity was 160 cps.

EXAMPLE FF

Preparation of Modified Siloxane Block Polymers

The procedure of Example J is following with the exception that 204.2 grams of cyclic tetramer, 11.4 grams of di(2-ethylhexy)dimethylsilane, 45.6 grams of tetradodecyltetramethylcyclotetrasiloxane and 2.0 grams of tetramethylammonium silanolate are charged to the reaction flask. The expected structure of the final product is

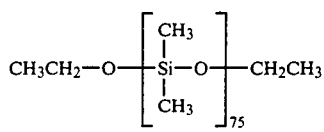

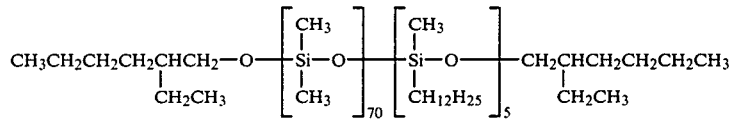

EXAMPLE GG

Preparation of Modified Siloxane Block Polymers

The procedure of Example K was followed with the exception that 226.7 grams of cyclic tetramer, 59.1 grams of

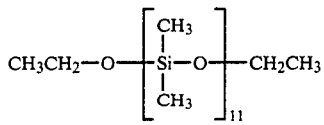

158.5 grams of hexamethyldiphenethylcyclotetrasiloxane and 2.1 grams of tetramethylammonium silanolate were charged to the reaction flask. Gel permeation chromatography indicated only one major product. The structure of the final product was

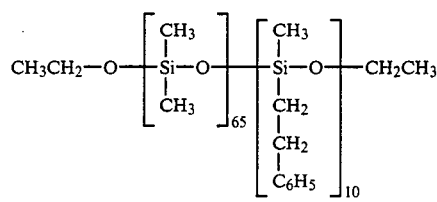

The index of refraction (25° C.) was 1.423; viscosity was 150 cps.

EXAMPLE 1

Silicone-modified-polyester Resin

The procedure of Example A was followed with the exception that 32.0 grams of

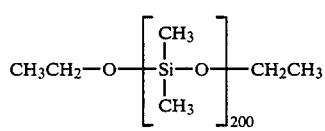

where charged with the other reactants and catalysts. The intrinsic viscosity of this resin was 0.60; elemental analysis indicated the presence of 3.5 weight percent silicone.

EXAMPLE 2

Silicone-modified-polyester Resin

The procedure of Example A was followed with the exception that 32.0 grams of were charged with the other reactants and catalysts. the intrinsic viscosity of this resin was 0.60; elemental analysis indicated the presence of 3.0 weight percent silicone.

EXAMPLE 3

Silicone-modified-polyester Resin

The procedure of Example 2 was followed with the exception that stirrer speed was increased to 250 rpm. The intrinsic viscosity of this resin was 0.70; elemental analysis indicated the presence of 3.2 weight percent silicone.

EXAMPLE 4

Silicone-modified-polyester Resin

The procedure of Example A was followed with the exception that 32.0 grams of

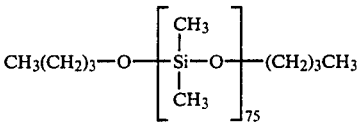

were charged. The intrinsic viscosity of this resin was 0.51; elemental analysis indicated the presence of 3.8 weight percent silicone.

EXAMPLE 5

Silicone-modified-polyester Resin

The procedure of Example A was followed with the exception that 32.0 grams of

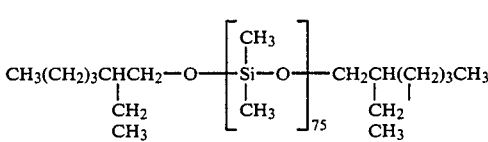

where charged. The intrinsic viscosity of this resin was 0.55; elemental analysis indicated the presence of 3.2 weight percent silicone.

EXAMPLE 6

Silicone-modified-polyester Resin

The procedure of Example A was followed with the exception that 32.0 grams of

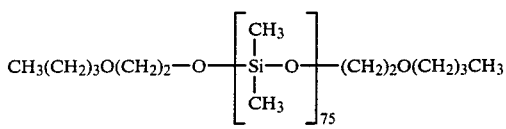

were charged. The intrinsic viscosity of this resin was 0.49; elemental analysis indicated the presence of 3.5 weight percent silicone.

EXAMPLE 7

Silicone-modified-polyester Resin

The procedure of Example A was followed with the exception that 32.0 grams of

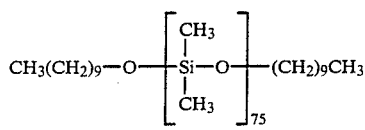

where charged. The intrinsic viscosity of this resin was 0.62; elemental analysis indicated the presence of 3.9 weight percent silicone.

EXAMPLE 8

Silicone-modified-polyester Resin

The procedure of Example A was followed with the exception that 32.0 grams of

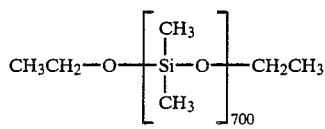

were charged. In addition, stirrer rates were changed in the following manner: (1) stirring was maintained initially at 250 rpm for 30 minutes, (2) after 30 minutes stirring rate was reduced to 150 rpm and maintained for the remainder of the polymerization. The intrinsic viscosity of this resin was 0.57; elemental analysis indicated the presence of 3.4 weight percent silicone.

EXAMPLE 9

Silicone-modified-polyester Resin

The procedure of Example 2 was followed with the exception that stirring rates were changed in the following manner: (1) stirring was maintained at 250 rpm for 1 hour, (2) after 1 hour stirring rate was reduced to 150 rpm and maintained for the remainder of the polymerization. The intrinsic viscosity of this resin was 0.62; elemental analysis indicated the presence of 4.4 weight percent silicone.

EXAMPLES 10 TO 29

Silicone-modified-polyester Resin

The procedure of Example A was followed with the exception that 32.0 grams of

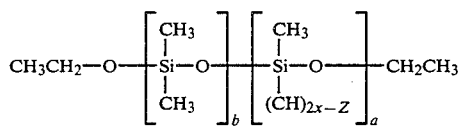

was charged with the other reactants and catalysts, where a,b,x and Z are defined in Table A.

TABLE A

| Example | a | b | x | Z | Average Domain Size | Intrinsic Viscosity | % Wt. Silicon |
|---|---|---|---|---|---|---|---|
| 10 | 5 | 70 | 0 | $C_2H_5$ | 24 | 0.80 | 2.9 |
| 11 | 5 | 70 | 0 | $C_6H_{13}$ | 6.2 | 0.76 | 2.7 |
| 12 | 5 | 70 | 0 | $C_8H_{17}$ | 5.0 | 0.58 | 2.9 |
| 13 | 5 | 70 | 0 | $C_{10}H_{21}$ | 5.3 | 0.58 | 2.4 |
| 14 | 5 | 70 | 0 | $C_{12}H_{25}$ | 5.0 | 0.41 | 3.1 |
| 15 | 5 | 70 | 0 | $C_{18}H_{37}$ | 1 | 0.54 | 2.8 |
| 16 | 5 | 70 | 3 | $N(C_4H_8)$ | 13 | 0.60 | 3.2 |
| 17 | 5 | 70 | 3 | $OC_2H_4OC_4H_9$ | 22 | 0.68 | 2.5 |
| 18 | 5 | 70 | 3 | $O(C_2H_4O)_3CH_3$ | 22 | 0.67 | 2.7 |
| 19 | 5 | 70 | 3 | $O(C_3H_6O)_{6.3}CH_3$ | 28 | 0.57 | 2.7 |
| 20 | 5 | 70 | 3 | $O(C_3H_6O)_3CH_3$ | <1 | 0.72 | 3.0 |
| 21 | 5 | 70 | 2 | $CF_3$ | <20 | 0.55 | 2.8 |
| 22 | 5 | 70 | 2 | $C_8F_{17}$ | 7.3 | 0.71 | 3.0 |
| 23 | 7.5 | 67.5 | 0 | $C_{12}H_{25}$ | 3.4 | 0.57 | 2.9 |
| 24 | 2.5 | 72.5 | 0 | $C_{12}H_{25}$ | 7.5 | 0.67 | 2.6 |
| 25 | 2.5 | 72.5 | 0 | $C_{18}H_{37}$ | 2.7 | 0.66 | 2.9 |
| 26 | 5 | 70 | 0 | $C_6H_5$ | 7 | 0.49 | 2.5 |
| 27 | 5 | 70 | 3 | CN | 8.5 | 0.65 | 2.3 |
| 28 | 5 | 70 | 2 | $C_6H_5$ | 16 | 0.63 | 2.4 |
| 29 | 10 | 65 | 2 | $C_6H_5$ | 11 | 0.82 | 3.0 |

PROCEDURE B

Unmodified Poly(ethyleneterephthate) Resin

A stainless steel reactor was equipped with a mechanical stirrer (Model HST 20; G. K. Heller Corp.), condenser and argon sparge. To this reactor was charged 150 grams of dimethylterephthalate (DMT) and 119 grams of ethylene glycol (EG). Then, 0.05 grams of manganese acetate and 0.06 grams of antimony oxide were added as catalysts. Using an electrical heating mantel, the reactor temperature was brought to 175° C. and stirring at 50 rpm was initiated. Subsequently, the temperature was raised to 200° C. and held at this temperature for 1.5 hours to effect transesterification. At the end of this interval, approximately 80 percent of the theoretical quantity of methanol had evolved. Subsequently, the reactor temperature was raised to approximately 240° C. and maintained at this temperature for approximately 1 hour. At the end of this interval, an additional 20 percent of theoretical methanol has been collected, bringing the total up to 100 percent of the theoretical quantity. At this point, the stirring rate was reduced to 25 RPM and the reactor temperature was gradually increased to 275° C.–280° C. while pressure was slowly reduced to approximately 0.2 mmHg. The progress of polymerization was monitored by the torque required to maintain a constant stirring rate. Initial torque readings were typically 3–4 pounds-inch. When torque had increased to approximately 25 pounds-inch, stirring was stopped and reaction pressure was raised to atmospheric by bleeding in argon. Using a slight positive pressure, the molten resin was discharged into water. The intrinsic viscosity of this resin (measured in a solvent of 1 part by weight of trifluoroacetic acid and 3 parts by weight of dichloromethane) was 0.50.

EXAMPLE 30

Silicone-modified Polyester Resin

The procedure of Example A is followed with the exception that 32.0 grams of

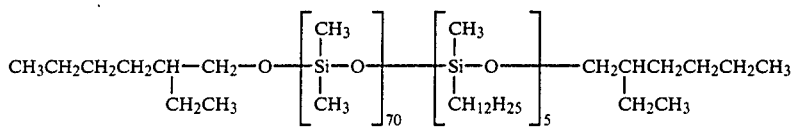

is charged with the other reagents and catalysts. It is anticipated that the domain size will reflect the enhanced solubility of the silicone in the polyester.

EXAMPLE 31

Silicone Modified-polyester Resin

Procedure B was followed with the exception that 6.5 grams of

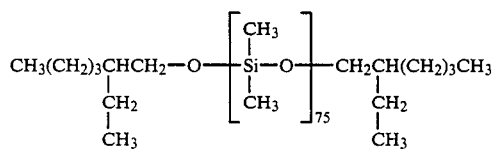

was charged. Fibers pulled from molten resin could be cold drawn by a factor of 10×.

EXAMPLE 32

Silicone-Modified-polyester Resin

Procedure B was followed with the exception that 13.0 grams of

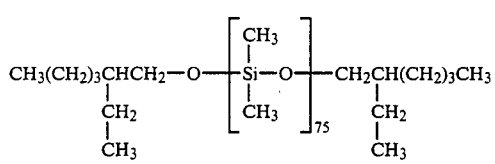

was charged. Fibers pulled from often resin could be cold drawn by a factor of 8×.

EXAMPLE HH

Silicone-Modified-polyester Resins

Procedure B was followed with the exception that 20.0 grams of

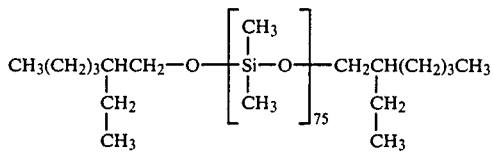

was charged. The final product could not be discharged into water. On opening the hot reactor apparatus, a rubbery molten mass was discovered. Attempts to pull fibers from this mass were unsuccessful.

EXAMPLE 32

Silicone-Modified-polyester Resin

Procedure B was followed with the exception that 20 grams of

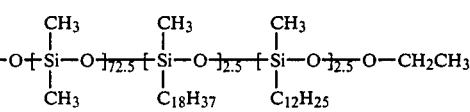

was charged. The final product was highly viscous but was successfully discharged into water. Fiber samples were pulled from the molten resin. Due to the fact that the pull occurred at too low a temperature a brittle fiber resulted that was unable to be drawn.

EXAMPLE 34

Silicone-Modified-polyester Resin

The following procedure, which is based on early experiments in polymer synthesis, is a technique for probing the incorporation of silicone into polyester resin.

A clean, dry glass polymerization tube was charged with 38.8 grams of dimethylterephthalate (DMT), 31.2 grams of ethylene glycol (EG), 216 μl of a 5 weight percent solution of Zn(OAc)$_2$.2H$_2$O in ethylene glycol, 12 μl of ethylantimonate (III) and the desired quantity of

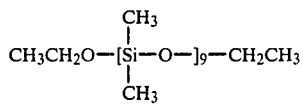

Then, the polymerization tube and contents were placed in a fluidized sand bath. A mild argon sparge was admitted through an inlet. The temperature was then raised to 180° C. and held there for three hours. During this step, transesterification of DMT with EG occurs and by-product methanol was distilled off. Subsequently, the temperature was increased to 230° C. and held there for one hour. During this operation, excess EG was removed from the reaction mass. With this step completed, the temperature was elevated to 275° C.-280° C. During this period, the argon sparge was lowered into the system until it reached a depth of 1-2 mm. Caution is advised during this operation because certain modifiers tend to cause undue foaming of the melt. The polycondensation step was allowed to proceed under these conditions for about three hours. At the end of the polymerization, the apparatus was brought to atmospheric pressure using argon and the polymerization tube pulled from the bath to cool. The polymer was then recovered by breaking away the glass.

Fibers were obtained by pulling filaments from a melt of chips of recovered resin at 280° C.-290° C. under a blanket of argon using a glass rod as a probe. The fibers so obtained would cold draw to several times their length if the molecular weight was sufficiently high.

EXAMPLE 35

Silicone-modified Poly(Butyleneterephthalate)

Procedure B was followed with the exception that the following were charged:

(1) 208 grams of 1,4-butanediol (no ethylene glycol was charged)
(2) 0.1 grams of tetra isopropyltitanate
(3) 6.5 grams of

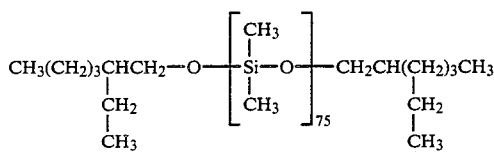

Because of the low melting point of poly(butyleneterephthalate), the reactor temperature is maintained at 260° C. Samples of fibers pulled from molten resin could be cold drawn by a factor of 8×.

Domain Size Determination

Samples of resin were fractured and sputtered with gold to a thickness of approximately 300 Angstroms (A). Using a Hitachi Model S-450 scanning electron microscope operating at approximately 20 kilovolts accelerating voltage, Polaroid photographs of typical fracture surfaces were taken at approximately 1200× magnification. Domain sizes were measured from the photographs and reported as mean, maximum, and minimum values. The mean domain size was determined from twenty randomly selected domains.

Electron Spectroscopy for Chemical Analysis (ESCA) Fiber Surface Characterization ESCA data were obtained using a Perkin-Elmer Electronics Division Model 550 spectrometer. The excitation radiation was generated using an achromatic Mg anode x-ray source operating at 15 KV and 20 mA with an energy of 1253.6 electron volts (ev) (Mg K$\alpha$).

Survey scans of each sample were collected at a pass energy of 100 ev. In addition, higher resolution spectra of individual photoelectron lines of interest such as Si(2p) were collected at a pass energy of 50 ev.

The binding energy scale of the spectrometer was calibrated to the Au(4f) 7/1 line at 83.8 ev. Additional static charge corrections were made using the adventitious carbon (1s) line at 284.6 ev.

Under the operating conditions used, the spectrometer analysis area was a circular region with an approximate diameter of 6-7 mm. This large analysis area required special specimen preparation methods since individual fiber diameters were approximately 20 microns.

Specimens were prepared by wrapping polyester filament around a 1 sq. cm section of high purity aluminum foil. The aluminum foil had been previously washed in hexane, argon-ion sputtered and analyzed by xps to ensure that surface contamination by carbon and oxygen had been minimized.

Specimens were attached to a stainless steel xps sample holder and placed onto the spectrometer's (introduce) rod. Then specimens were moved into the prepump chamber where they were evacuated for 15 minutes to a pressure of approximately $1 \times 10^{-6}$ torr. They were then introduced into analysis chambers of the spectrometer which was maintained to a pressure of approximately $8 \times 10^{-9}$ torr.

During the analysis it became evident that the aluminum foil was not completely covered by polyester filament since low concentrations of aluminum were invariably observed in fiber spectra. However, since Al2p and Al2s photoelectron lines do not overlap any of the photoelectron lines generated from experimentions specimens, the results of silicone determinates were unaffected.

TABLE 1

Effect of Silicone Molecular Weight of Poly(ethylene terephthalate)/Silicone Copolymer Surface Energy

| Composition[1] | Contact Angle On Resin Surface[2] |
|---|---|
| PET[3] | 70° |
| PET/CH$_3$CH$_2$—O—[Si(CH$_3$)$_2$—O]$_{700}$—CH$_2$CH$_3$ | 70° |
| PET/CH$_3$CH$_2$—O—[Si(CH$_3$)$_2$—O]$_{200}$—CH$_2$CH$_3$ | 70° |
| PET/CH$_3$CH$_2$—O—[Si(CH$_3$)$_2$—O]$_{75}$—CH$_2$CH$_3$ | 80° |
| PET/CH$_3$CH$_2$—O—[Si(CH$_3$)$_2$—O]$_{15}$—CH$_2$CH$_3$ | 90° |
| Teflon ™ | 90° |

[1]Copolymers contained five weight percent silicone.
[2]Water/iso-propyl alcohol.
[3]Poly(ethylene terephthalate)

TABLE 2

Thermal Transitions of Resin

| Composition[1] | Glass Transition Temp. (°C.) | Glass Transition Temp. (°C.) | Melting Point PET |
|---|---|---|---|
| PET | — | 85 | 256 |
| PET/CH$_3$CH$_2$—O—[Si(CH$_3$)(CH$_3$)—O]$_{200}$—CH$_2$CH$_3$ | −112 | 70 | 248 |
| PET/CH$_3$CH$_2$—O—[Si(CH$_3$)(CH$_3$)—O]$_{75}$—CH$_2$CH$_3$ | −117 | 82 | 256 |

[1]Copolymeric resins contain five weight percent silicone.

TABLE 3

Fiber Physical Properties

| Composition[1] | Tenacity (grams/denier) | Elongation % | Modulus (grams/denier) |
|---|---|---|---|
| PET | 2.8 | 167 | 25 |
| PET/CH$_3$CH$_2$—O—[Si(CH$_3$)(CH$_3$)—O]$_{200}$—CH$_2$CH$_3$ | 2.6 | 143 | 23 |
| PET/CH$_3$CH$_2$—O—[Si(CH$_3$)(CH$_3$)—O]$_{75}$—CH$_2$CH$_3$ | 2.1 | 151 | 22 |

[1]Copolymeric resins contain five weight percent silicone.

TABLE 4

ESCA (Electron Spectroscopy for Chemical Analysis) Fiber Surface Characterization

| Composition[1] | Weight Percent Silicone On Fiber Surface — Undrawn | Weight Percent Silicone On Fiber Surface — Drawn |
|---|---|---|
| PET | 15 | — |
| PET/CH$_3$CH$_2$—O—[Si(CH$_3$)(CH$_3$)—O]$_{200}$—CH$_2$CH$_3$ | 49 | 86 |
| PET/CH$_3$CH$_2$—O—[Si(CH$_3$)(CH$_3$)—O]$_{75}$—CH$_2$CH$_3$ | 57 | 78 |

[1]Fiber contains 5.0 weight percent silicone based on reactants charged.

TABLE 5

Effect of Agitation Rate and Endblocker on Domain Size

| Silicone-co-polyester | Agitation Speed (RPM) | IV[(1)] | Domain Diameter (μ) Maximum | Domain Diameter (μ) Minimum | Domain Diameter (μ) Mean |
|---|---|---|---|---|---|
| PET/CH$_3$CH$_2$—O—[Si(CH$_3$)(CH$_3$)—O]$_{75}$—CH$_2$CH$_3$ | 50 | 0.60 | 131 | 36 | 69 |
| PET/CH$_3$CH$_2$—O—[Si(CH$_3$)(CH$_3$)—O]$_{75}$—CH$_2$CH$_3$ | 250 | 0.70 | 1 | 0.2 | 0.5 |
| [(2)]PET/CH$_3$CH$_2$—O—[Si(CH$_3$)(CH$_3$)—O]$_{75}$—CH$_2$CH$_3$ | 250/150 | 0.62 | 2 | 0.2 | 0.4 |

TABLE 5-continued

Effect of Agitation Rate and Endblocker on Domain Size

| Silicone-co-polyester | Agitation Speed (RPM) | IV[1] | Domain Diameter ($\mu$) Maximum | Minimum | Mean |
|---|---|---|---|---|---|
| PET/CH$_3$(CH$_2$)$_3$—O—[Si(CH$_3$)$_2$—O]$_{75}$—(CH$_2$)$_3$CH$_3$ 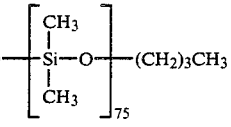 | 50 | 0.51 | 15 | 2 | 6 |
| PET/CH$_3$(CH$_2$)$_3$CH(CH$_2$CH$_3$)CH$_2$—O—[Si(CH$_3$)$_2$—O]$_{75}$—CH$_2$CH(CH$_2$CH$_3$)(CH$_2$)$_3$CH$_3$ 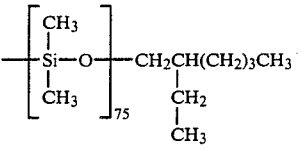 | 50 | 0.55 | 3 | 0.2 | 0.7 |

[1]Intrinsic Viscosity.
[2]High agitation rate used during glycol strip and initial polycondensation; lower rate used during latter stage of polycondensation.

What is claimed is:

1. A process for preparing a silicone-modified polyester resin comprising reacting an aromatic dicarboxylic acid or its diester, a diol and a siloxane block polymer of the general formula:

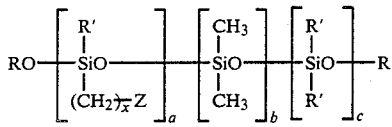

$$RO{\left[\begin{matrix}R'\\|\\SiO\\|\\(CH_2)_xZ\end{matrix}\right]}_a{\left[\begin{matrix}CH_3\\|\\SiO\\|\\CH_3\end{matrix}\right]}_b{\left[\begin{matrix}R'\\|\\SiO\\|\\R'\end{matrix}\right]}_c R$$

wherein
R is individually a monovalent group selected from the group consisting of alkyl, aryl, acyl, aralkyl and polyoxyalkyl groups;
R' is individually a monovalent group selected from the group consisting of alkyl, aryl, alkenyl, and aralkyl groups containing from 1 to 8 carbon atoms;
Z is selected from the group consisting of alkyl, aryl, aralkyl, alkoxy, polyoxyalkyl, alkenyl and siloxy with the proviso that when Z is siloxy x must equal zero;
a has a value of 0 to 10;
b has a value of 0 to 50,000;
c has a value of 0 to 1,000 and the sum of a+b+c is such that the siloxane block polymer contains at least 9 silicon atoms; and
x has a value of 0, 1, 2 or 3; wherein said reaction takes place in two stages, the first stage being either a transesterification between the diester of the dicarboxylic acid and the diol and siloxane block polymer or an esterification between the dicarboxylic acid and the diol and siloxane block polymer, the second stage being a polycondensation reaction of the transesterification or esterification product wherein said siloxane block polymer constitutes from 0.1 to 10 weight percent, based on the total reaction product and forms uniform domains approximately 0.05 to 6 micron in average size.

2. The process of claim 1 wherein the aromatic dicarboxylic acid is selected from the group of aromatic dicarboxylic acids having 8 to 15 carbon atoms.

3. The process of claim 1 wherein the diester of an aromatic dicarboxylic acid is selected from the group of C$_1$ to C$_4$ dialkyl esters of aromatic dicarboxylic acids having 8 to 15 carbon atoms.

4. The process of claim 2 wherein the aromatic dicarboxylic acid is symmetrical.

5. The process of claim 4 wherein the aromatic dicarboxylic acid is terephthalic acid.

6. The process of claim 3 wherein the ester of the aromatic dicarboxylic acid is dimethylterephthalate.

7. The process of claim 1 wherein the diol has from 2 to 20 carbon atoms.

8. The process of claim 7 wherein the diol is selected from the group consisting of branched or unbranched aliphatic diols, bis(hydroxyphenyl)alkanes, di(hydroxyphenyl)sulfones and di(hydroxyphenyl)ethers.

9. The process of claim 8 wherein the diol is an aliphatic diol.

10. The process of claim 9 wherein the diol is ethylene glycol.

11. The process of claim 1 wherein the siloxane block polymer is such that R is an oleophillic group containing from 1 to 18 carbon atoms.

12. The process of claim 11 wherein R contains from 1 to 12 carbon atoms.

13. The process of claim 12 wherein R is either ethyl or 2-ethylhexyl.

14. The process of claim 1 wherein the siloxane block polymer is such that R' is an oleophillic group containing from 1 to 8 carbon atoms.

15. The process of claim 14 wherein R' is an alkyl group.

16. The process of claim 15 wherein R' is methyl.

17. The process of claim 1 wherein the siloxane block polymer is such that Z is an oleophillic group containing from 1 to 25 carbon atoms.

18. The process of claim 17 wherein Z is an oleophillic group containing from 1 to 15 carbon atoms.

19. A process for preparing a silicone-modified polyester resin comprising reacting an aromatic dicarboxylic acid or its diester, a diol and a siloxane block polymer of the general formula:

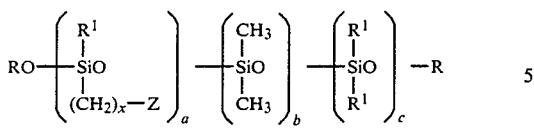

wherein
R is individually a monovalent group selected from the group consisting of alkyl, aryl, acyl, aralkyl and polyoxyalkyl groups;

R' is individually a monovalent group selected from the group consisting of alkyl, aryl, alkenyl, and aralkyl groups consisting of alkyl, aryl, alkenyl, and aralkyl groups containing from 1 to 8 carbon atoms;

Z is an oleophillic group containing from 1 to 15 carbon atoms selected from the group consisting of alkyl, aryl, aralkyl, alkoxy, polyoxyalkyl, alkenyl and siloxy, while oleophillic group is substituted with a group selected from the group consisting of halogen, cyano, amino, carboxy, sulfonate, alkylmercapto and hydroxy with the proviso that when Z is siloxy x must equal zero;

a has a value of 0 to 10;

b has a value of 0 to 50,000;

c has a value of 0 to 1,000 and the sum of $a+b+c$ is such that the siloxane block polymer contains at least 9 silicon atoms; and x has a value of 0, 1, 2 or 3; wherein said reaction takes place in two stages, the first stage being either a transesterification between the diester of the dicarboxylic acid and the diol and siloxane block polymer or an esterification between the dicarboxylic acid and the diol and siloxane block polymer, the second stage being a polycondensation reaction of the transesterification or esterification product wherein said siloxane block copolymer constitutes from 0.1 to 10 weight percent, based on the total reaction product and forms uniform domains approximately 0.05 to 6 micron in average size.

20. The process of claim 1 wherein the siloxane block polymer is such that a has a value of 0 to 5.

21. The process of claim 1 wherein the siloxane block polymer is such that b has a value of from 10 to 10,000.

22. The process of claim 21 wherein b has a value of from 50 to 200.

23. The process of claim 1 wherein the siloxane block polymer is such that c has a value of from 0 to 100.

24. The process of claim 23 wherein c is zero.

25. The process of claim 1 wherein the siloxane block polymer is such that R is 2-ethylhexyl, a is 0, b is 75, and c is zero.

26. The process of claim 1 wherein the siloxane block polymer is such that R is 2-ethylhexyl, R' is methyl, Z is $CH_3O(C_2H_4O)_{6.3}$, a is 5, b is 70, c is zero and x is 3.

27. The process of claim 6 wherein the siloxane block polymer is such that R is ethyl, R' is methyl, Z is $-CH_2CH_2CF_3$, a is 5, b is 70, c is zero and x is zero.

28. The process of claim 1 wherein the siloxane block polymer is such that R is ethyl, R' is methyl, Z is $-C_2H_4C_6H_5$, a is 10, b is 65, c is zero and x is zero.

29. The process of claim 1 wherein the siloxane block polymer is such that R is ethyl, R' is methyl, Z is $-C_{15}H_{31}$, a is 5, b is 70, c is zero, and x is 3.

30. The process of claim 19 wherein the siloxane block polymer is such that R is ethyl, R' is methyl, Z is

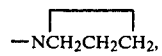

a is 5, b is 70, c is zero and x is 3.

31. A silicone-modified polyester resin comprising:
(a) a polyester matrix comprising the reaction product of an aromatic dicarboxylic acid or its diester and a diol;
(b) a silicone-modified polyester matrix comprising the reaction product of an aromatic dicarboxylic acid or its diester, a diol and a siloxane-block polymer of the general formula:

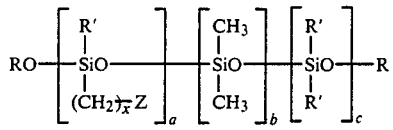

wherein
R is individually a monovalent group selected from the group consisting of alkyl, aryl, acyl, aralkyl and polyoxyalkyl groups;

R' is individually a monovalent group selected from the group consisting of alkyl, aryl, alkenyl and aralkyl groups containing from 1 to 8 carbon atoms;

Z is selected from the group consisting of alkyl, aryl, aralkyl, alkoxy, polyoxyalkyl, alkenyl and siloxy with the proviso that when Z is siloxy x must equal zero;

a has a value of 0 to 10;

b has a value of 0 to 50,000;

c has a value of 0 to 1,000 and the sum of $a+b+c$ is such that the polysiloxane block polymer contains at least 9 silicon atoms; and x has a value of 0, 1, 2 or 3; and (c) optionally a polysiloxane block polymer wherein said silicone-modified polyester matrix is dispersed throughout the polyester matrix as microdomains of between 0.05 to 6 micron size and contain, when present, encapsulated polysiloxane block polymer.

32. The resin of claim 31 wherein the aromatic dicarboxylic acid is selected from the group of aromatic dicarboxylic acids having 8 to 15 carbon atoms.

33. The resin of claim 31 wherein the diester of an aromatic dicarboxylic acid is selected from the group of $C_1$ to $C_4$ dialkyl esters of aromatic dicarboxylic acids having 8 to 15 carbon atoms.

34. The resin of claim 32 wherein the aromatic dicarboxylic acid is symmetrical.

35. The resin of claim 34 wherein the aromatic dicarboxylic acid is terephthalic acid.

36. The resin of claim 33 wherein the ester of the aromatic dicarboxylic acid is dimethylterephthalate.

37. The resin of claim 31 wherein the diol has from 2 to 20 carbon atoms.

38. The resin of claim 37 wherein the diol is selected from the group consisting of branched or unbranched aliphatic diols, bis(hydroxyphenyl)alkanes, di(hydroxyphenyl)sulfones and di(hydroxyphenyl)ethers.

39. The resin of claim 38 wherein the diol is an aliphatic diol.

40. The resin of claim 39 wherein the diol is ethylene glycol.

41. The resin of claim 31 wherein the siloxane block polymer is such that R is an oleophillic group containing from 1 to 18 carbon atoms.

42. The resin of claim 41 wherein R contains from 1 to 12 carbon atoms.

43. The resin of claim 42 wherein R is either ethyl or 2-ethylhexyl.

44. The resin of claim 41 wherein the siloxane block polymer is such that R' is an oleophillic group containing from 1 to 8 carbon atoms.

45. The resin of claim 44 wherein R' is an alkyl group.

46. The resin of claim 45 wherein R' is methyl.

47. The resin of claim 31 wherein the siloxane block polymer is such that Z is an oleophillic group containing from 1 to 25 carbon atoms.

48. The resin of claim 47 wherein Z is an oleophillic group containing from 1 to 15 carbon atoms.

49. A silicone-modified polyester resin comprising:
(a) a polyester matrix comprising the reaction product of an aromatic dicarboxylic acid or its diester and diol;
(b) a silicone-modified polyester matrix comprising the reaction product of an aromatic dicarboxylic acid or its diester, a diol and a siloxane-block polymer of the general formula:

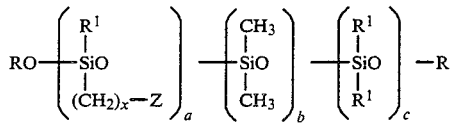

wherein
R is individually a monovalent group selected from the group consisting of alkyl, aryl, acyl aralkyl and polyoxyalkyl groups;
R' is individually a monovalent group selected from the group consisting of alkyl, aryl, alkenyl and aralkyl groups containing from 1 to 8 carbon atoms;
Z is an oleophillic group containing from 1 to 15 carbon atoms selected from the group consisting of alkyl, aryl, aralkyl, alkoxy, polyoxyalkyl, alkenyl and siloxy which oleophillic group is substituted with a group selected from the group consisting of halogen, cyano, amino, carboxy, sulfonate, alkylmercapto and hydroxy with the proviso that when Z is siloxy x must equal zero;
a has a value of 0 to 10;
b has a value of 0 to 50,000;
c has a value of 0 to 1,000 and the sum of a+b+c is such that the siloxane block polymer contains at least 9 silicon atoms; and
x has a value of 0, 1, 2, 3; and
(c) optionally a polysiloxane block polymer wherein said silicone-modified polyester matrix is dispersed throughout the polyester matrix as microdomains of between 0.05 to 6 micron size and contain, when present, encapsulated polysiloxane block polymer.

50. The resin of claim 31 wherein the siloxane block polymer is such that a has a value of 0 to 5.

51. The resin of claim 31 wherein the siloxane block polymer is such that b has a value of from 10 to 10,000.

52. The resin of claim 51 wherein b has a value of from 50 to 200.

53. The resin of claim 31 wherein the siloxane block polymer is such that c has a value of from 0 to 100.

54. The resin of claim 53 wherein c is zero.

55. The resin of claim 31 wherein the siloxane block polymer is such that R is 2-ethylhexyl, a is 0, b is 75, and c is zero.

56. The resin of claim 31 wherein the siloxane block polymer is such that R is 2-ethylhexyl, R' is methyl, Z is $CH_3O(C_2H_4O)_{6.3}$, a is 5, b is 70, c is zero and x is 3.

57. The resin of claim 7 wherein the siloxane block polymer is such that R is ethyl, R' is methyl, Z is —$CH_2CH_2CF_3$, a is 5, b is 70, c is zero and x is zero.

58. The resin of claim 31 wherein the siloxane block polymer is such that R is ethyl, R' is methyl, Z is —$C_2H_4C_6H_5$, a is 10, b is 65, c is zero and x is zero.

59. The resin of claim 31 wherein the siloxane block polymer is such that R is ethyl, R' is methyl, Z is —$C_{15}H_{31}$, a is 5, b is 70, c is zero, and x is 3.

60. The resin of claim 7 wherein the siloxane block polymer is such that R is ethyl, R' is methyl, Z is

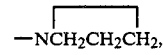

a is 5, b is 70, c is zero and x is 3.

* * * * *